United States Patent [19]
Moore

[10] Patent No.: US 6,633,854 B1
[45] Date of Patent: Oct. 14, 2003

(54) SYSTEM AND METHOD FOR ANALYZING GENERTIC ALGORITHMS

(75) Inventor: Sean Samuel Butler Moore, Hollis, NH (US)

(73) Assignees: Genuity Inc., Burlington, MA (US); Verizon Corporate Services Group Inc., New York, NY (US)

(*) Notice: Subject to any disclaimer, the term of this patent is extended or adjusted under 35 U.S.C. 154(b) by 0 days.

(21) Appl. No.: 09/434,642

(22) Filed: Nov. 5, 1999

(51) Int. Cl.[7] .............................. G06N 3/00; G06N 3/12; G06F 15/18
(52) U.S. Cl. ............................ 706/13; 706/45; 706/14
(58) Field of Search ............................ 706/13, 14, 45

(56) References Cited

U.S. PATENT DOCUMENTS

| | | | | |
|---|---|---|---|---|
| 4,935,877 A | * | 6/1990 | Koza | 706/13 |
| 5,319,781 A | | 6/1994 | Sywerda | 705/8 |
| 5,848,403 A | | 12/1998 | Gabriner et al. | 706/13 |
| 5,946,673 A | * | 8/1999 | Francone et al. | 700/246 |

OTHER PUBLICATIONS

S. C. Ng et al; The Genetic search Approach; 1996; IEEE; 1053–5888/96; 38–46.*

Trevor D. Collins et al; Understanding Evolutionary Computing: A Hands on Approach; 1998; IEEE; 0–7803–4869–9/98; 564–569.*

D.C. Montgomery, Design and Analysis of Experiments, Chapters 3, 7 and 9 (3$^{rd}$ ed., 1991).

* cited by examiner

Primary Examiner—Emanuel Todd Voeltz
Assistant Examiner—Joseph P. Hirl
(74) Attorney, Agent, or Firm—Leonard Charles Suchyta; James K. Weixel

(57) ABSTRACT

Systems and methods consistent with the present invention analyze control parameters of evolutionary algorithms. To this end, the system determines the value of a control parameter that controls the operation of the evolutionary algorithm. The system then executes the evolutionary algorithm according to the determined value of the control parameter to obtain a response value. Finally, the system determines an effect vector describing how a change in the value of the control parameter affects the response value. Systems and methods consistent with the present invention may also predict how changing the levels of a control parameter will affect the response value of the evolutionary algorithm. The system may also normalize an objective function of the evolutionary algorithm such that control parameters of the objective function have a relatively equal effect on the overall objective function.

40 Claims, 4 Drawing Sheets

SYSTEM AND METHOD FOR ANALYZING GENERTIC ALGORITHMS

BACKGROUND OF THE INVENTION

1. Field of the Invention

The present invention relates to methods and systems for analyzing genetic algorithms and, more particularly, to methods and systems for analyzing control parameters of genetic algorithms and for analyzing the genetic algorithm's parent class of evolutionary algorithms.

2. Description of the Related Art

Evolutionary algorithms (EAs), including genetic algorithms, have been used to determine optimal solutions to complex problems. U.S. Pat. No. 5,848,403, for example, describes the use of EAs to generate resource schedules for performing various tasks. To solve such problems, EAs start by generating an initial set of solutions to the problem. The EA then cyclically evaluates the quality of each solution using an objective function, selects those solutions having a relatively higher quality level, and alters the selected solutions. In this way, the EA eventually converges to an optimal solution after a number of iterations.

Several types of control parameters affect the speed, quality, and solution characteristics of such an EA system. While not an exhaustive list, these control parameters include: (1) the number of evaluations used to converge to the final result; (2) the population size of the initial set of solutions; and (3) the weighting factors of an objective function used to test the quality of each solution. Each of these control parameters will be described below.

The EA performs a number of evaluations to converge to the final recognition result. Typically, a programmer pre-defines the number of evaluations that the EA system will perform. Roughly speaking, the greater the number of evaluations, the higher the quality (as measured by the objective function) of the final result. However, the processing resource requirements increase along with the number of evaluations performed by the EA system. Thus, the programmer should select a number of evaluations that strikes the proper balance between processing resources and quality of the EA system's results.

The population size of the initial number of solutions also affects the speed and quality of the EA system. In particular, a larger population size provides better initial coverage of the solution space to the problem at hand. Thus, the EA may be more likely to find higher quality solutions when converging to the final result. On the other hand, a smaller initial population size may provide enough quality, while allowing the EA system to converge at a faster rate. Thus, the programmer should also carefully choose the number of initial solutions when balancing speed and quality constraints.

As known in the art, the EA system uses an objective function to measure interesting properties of each solution during the convergence process. The objective function may be any function that returns a numerical value. This value measures the quality of each potential solution. Based on the value of the objective function, the typical EA system selects the higher quality solutions, alters the selected solutions, and then repeats the entire cycle. In this way, the EA system converges to an optimal final result.

For illustrative purposes, an objective function is described that consists of a linear combination of several weighted subfunctions. Typically, each subfunction measures the quality of a possible solution in terms of a single property or characteristic of the problem at hand. For the scheduling problem described in U.S. Pat. No. 5,848,403, for example, the properties may be the distance between tasks, the time to achieve each task, labor costs, or customer satisfaction. The equation below describes an exemplary objective function:

$$F(x) = w_0 f_0(x) + w_1 f_1(x) \ldots + w_{N-1} f_{N-1}(x)$$

where:
- x represents a possible solution to the problem;
- $f_i(x)$ represents a subfunction for measuring the $i^{th}$ property of the problem; and
- $w_i$ represents a bias weight for subfunction $f_i(x)$, such that $0 \leq w_i \leq 1$.

Thus, a user can bias the EA to produce solutions that emphasize certain properties by changing the relative values of the bias weights applied to each subfunction. In this way, a programmer can choose to emphasize the relative importance of an individual subfunction when evaluating the quality of each possible solution. These bias weights may be viewed as input parameters, or control parameters, to the EA system.

Currently, programmers have no general purpose, analytical or empirical method to predict how varying the values of any of the above control parameters will affect the final result of the EA system. Each parameter may affect the final result to a different degree. Also, the effect of varying a particular parameter differs between different applications of an EA. Additionally, parameters may interact, such that the effect of varying one parameter may depend upon the current value of other parameters. Thus, a programmer must often resort to a trial-and-error approach to "tune" the parameters. Such an ad hoc approach, however, is inefficient, difficult to analyze, and difficult to reproduce.

Thus, it is desired to have a standardized system and method for analyzing EAs. In particular, it is desirable to have a system and method that can analyze how changing a control parameter value affects the response of an EA.

SUMMARY OF THE INVENTION

Systems and methods consistent with the present invention analyze control parameters of an evolutionary algorithm to thereby allow a programmer to understand the effects of changing control parameter values and to efficiently select new values for the control parameters.

In accordance with the purposes of the invention as embodied and broadly described herein, a system and method consistent with the present invention evaluates evolutionary algorithms. The system determines the value of a control parameter that controls the operation of the evolutionary algorithm. The system also executes the evolutionary algorithm according to the determined value of the control parameter to obtain a response value, and determines an effect vector describing how a change in the value of the control parameter affects the response value.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DETAILED DESCRIPTION

Overview

Systems and methods consistent with the present invention analyze control parameters of evolutionary algorithms ("EAs"). As used in the specification, the term "control parameter" refers to a variable selected by a programmer that controls how the EA interprets and alters data in reaching its final result. Each control parameter has an impact on the speed, quality, and solution characteristics of the EA. Thus, the value a programmer assigns to each parameter may have a powerful effect on the performance and response of the EA. To aid the programmer in this respect, the present system provides the programmer with information on how a particular control parameter affects the performance and response of the EA.

To this end, the programmer first selects a set of control parameters for the system to analyze. The system then executes the EA multiple times to obtain response values for when the selected control parameters are set to a variety of values. As used in the specification, the term "response value" refers to any measured output of the EA, such as the final result or any intermediate result, such as the output of an objective function. Based upon the different response values obtained from the different parameter settings, the system determines an effect vector. This vector describes how a change in the value of one or more control parameters affects the response value of the EA. The programmer then uses this information to efficiently select control parameter values that produce a desired response value.

The system can also predict how changing the value of a control parameter will affect the response value of the EA. To predict a new response value, the system determines a modified effects vector and then applies an inversion process to describe how the new value for the control parameter will affect the response value. Thus, from the modified effects vector, the system can then determine the predicted response value.

The system can also normalize the objective function such that each subfunction has a relatively equal effect on the function as a whole. In particular, the system can estimate normalization constants for the weighting factor of each subfunction. Using these constants, the system modifies the objective function such that a change in one weighting factor has approximately the same effect on the objective function as does an equivalent change in another weighting factor.

System Organization

Figure 1:
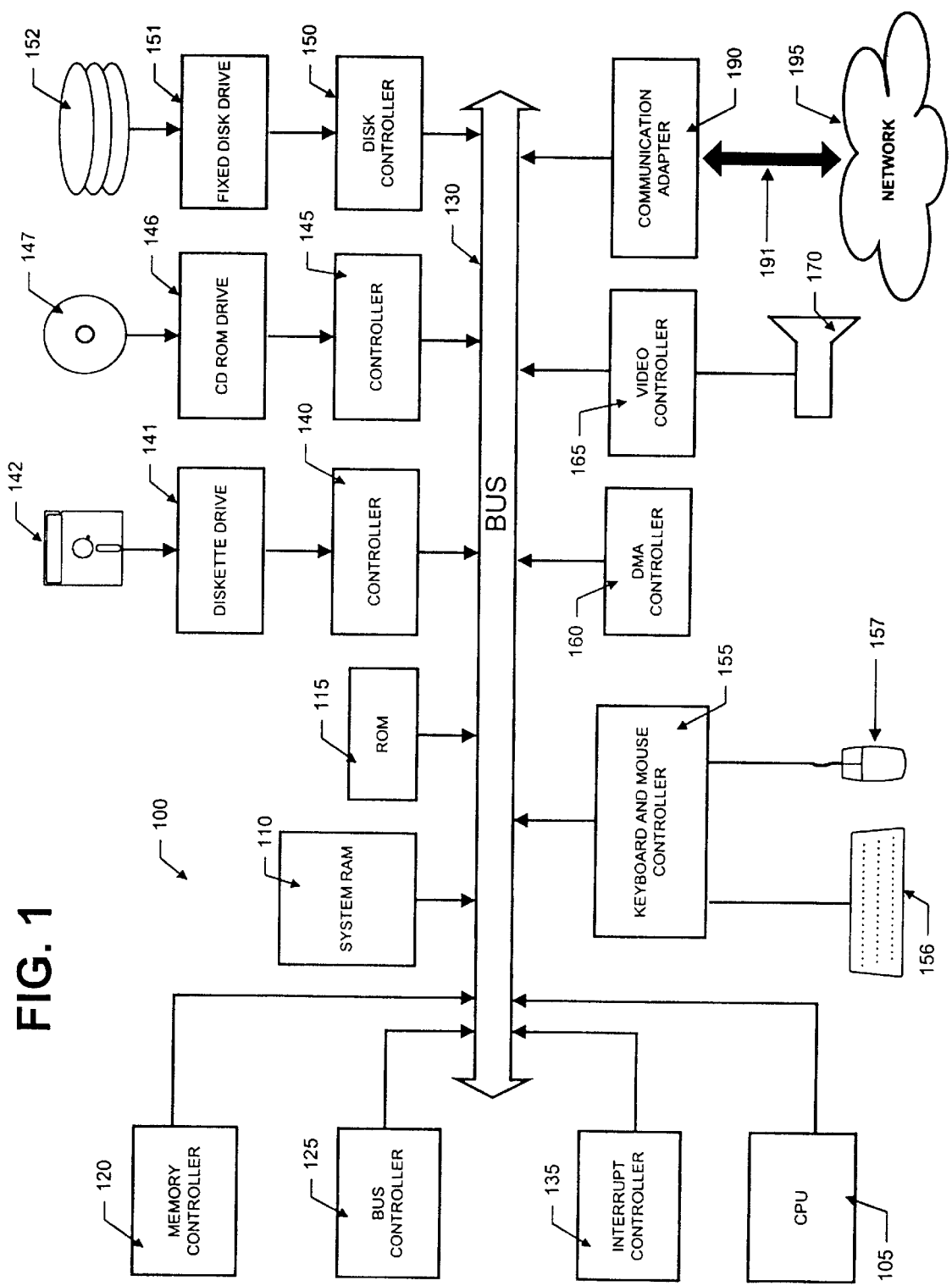
FIG. 1 is a diagram of a computer system for implementing the present invention.

FIG. 1 is a diagram of a computer system 100 for implementing the invention. The exemplary computer system of FIG. 1 is for descriptive purposes only. Although the description may refer to terms commonly used in describing particular computer systems, such as an IBM PS/2 personal computer, the description and concepts equally apply to other computer systems, such as network computers, workstations, and even mainframe computers having architectures dissimilar to FIG. 1.

Computer system 100 includes a central processing unit (CPU) 105, which may be implemented using a conventional microprocessor, a random access memory (RAM) 110 for temporary storage of information, and a read only memory (ROM) 115 for permanent storage of information. A memory controller 120 controls RAM 110. A bus 130 interconnects the components of computer system 100 and a bus controller 125 controls bus 130. An interrupt controller 135 receives and processes various interrupt signals from the components of computer system 100.

Mass storage may be provided by a diskette 142, a CD ROM 147, or a hard drive 152. Data and software may be exchanged with computer system 100 via removable media, such as diskette 142 and CD ROM 147. Diskette 142 inserts into a diskette drive 141 which, in turn, connects to bus 130 via a controller 140. Similarly, CD ROM 147 inserts into a CD ROM drive 146 which, in turn, connects to bus 130 via a controller 145. Hard disk 152 is part of a fixed disk drive 151 that connects to bus 130 via a controller 150.

A number of devices may provide user input to computer system 100. For example, a keyboard 156 and a mouse 157 connect to bus 130 via a controller 155. Computer system 100 may also include other types of well known input devices, such as a pen, a tablet, or speech recognition mechanisms. These devices may connect to bus 130 and an appropriate controller and software, as required.

A direct memory access (DMA) controller 160 performs direct memory access to RAM 110. A video display 17, controlled by a video controller 165, generates user output. Computer system 100 also includes a communications adaptor 190 that allows the system to interconnect to additional computing resources. These interconnections may be via a local area network (LAN) or a wide area network (WAN), such as the Internet, schematically illustrated by bus 191 and network 195. Signals traveling through network 195 can generally be referred to as "carrier waves" that transport information.

Although aspects of the present invention are described as being stored in memory in the form of instructions, one skilled in the art will appreciate that those aspects may be stored on other computer-readable media, such as secondary storage devices like hard disks, floppy disks, or CD ROM, or other forms of RAM or ROM, or a carrier wave. Finally, an operating system software controls the operation of computer system 100. The operating system controls allocation of system resources and performs tasks, such as memory management, process scheduling, networking, and services, among other things.

In systems consistent with the present invention, computer system 100 runs software programs defining an EA. These software programs define a set of rules and constraints for analyzing an initial population of solutions to a given problem. In particular, the software programs apply genetic processing techniques to determine an optimal solution to the problem. Such genetic processing techniques implemented by a computer software program are described in U.S. Pat. No. 5,848,403, the subject matter of which is hereby incorporated by reference.

Furthermore, computer system 100 contains a software program for implementing the invention. When executed, this software program evaluates the effect various control parameters have on the operation of the EA run by computer system 100. The methods and processes performed by the software program are more fully described below with respect to FIGS. 2 to 4.

System Operation

Figure 2:
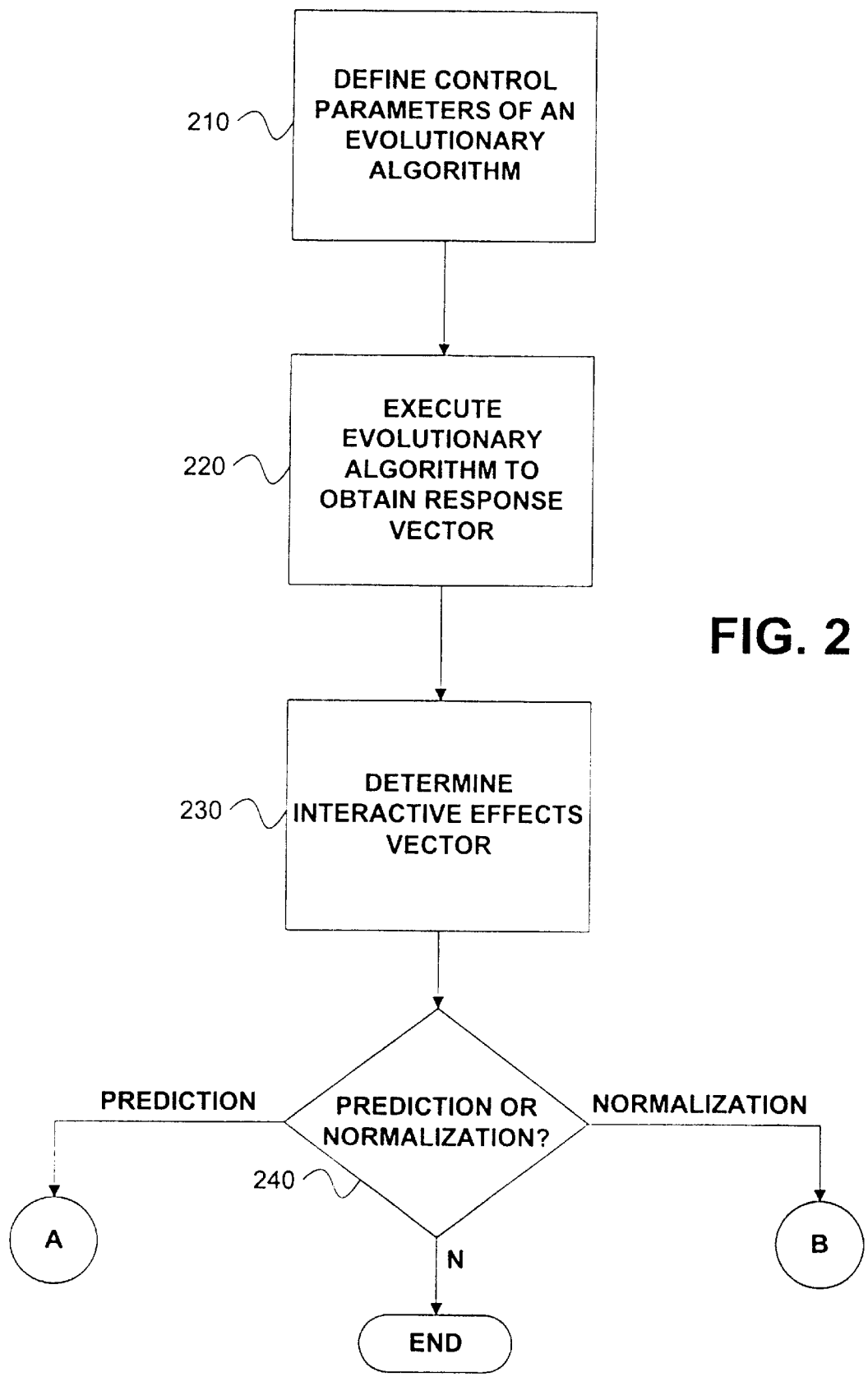
FIG. 2 is a flow diagram of a method consistent with the present invention for evaluating an EA.

FIG. 2 is a flow diagram of a method consistent with the present invention for evaluating an EA. As shown in FIG. 2, the method begins by defining a set of control parameters that computer system 100 will analyze (step 210). The parameters may be set by the programmer or by another process. Each control parameter is a variable that controls how the EA analyzes and interprets data to determine its final result. These control parameters may include, for example, a parameter representing the number of evaluations used to converge to the final result, a parameter representing the size of the initial population of solutions to the problem the EA attempts to optimally solve, and/or a parameter representing a weighting factor of an objective function used to test the quality of each solution.

Computer system 100 then executes the EA multiple times to obtain a response vector α (step 220). In particular, computer system 100 executes the EA multiple times to determine response values when the control parameters are set to a variety of values. Usually, each parameter may have a value selected from a discrete set of value level choices, which may be chosen using well-known design of experiments techniques, such as those disclosed in D. C. Montgomery, "Design and Analysis of Experiments," Chapters 7 and 9, ($3^{rd}$ ed. 1991), the relevant portions of which are hereby incorporated by reference. In such a case, computer system 100 produces a response vector α consisting of response values for each of the possible combinations of parameter values. Each response value represents a measurement of an output of the EA when computer system 100 executes the EA having the control parameters set to the corresponding values.

Consider the case, for example, when computer system 100 analyzes three control parameters of an EA. Assuming that each control parameter may be set to either a high level (+) or a low level (−), then computer system 100 will execute the EA to determine the response values comprising a vector α for each of the eight different possible combinations of parameter values. Table 1 shows the response values for the different combinations of the three control parameters set at one of the two levels.

TABLE 1

| First Parameter | Second Parameter | Third Parameter | Response Value |
|---|---|---|---|
| + | + | + | $\alpha_{+++}$ |
| − | + | + | $\alpha_{-++}$ |
| + | − | + | $\alpha_{+-+}$ |
| − | − | + | $\alpha_{--+}$ |
| + | + | − | $\alpha_{++-}$ |
| − | + | − | $\alpha_{-+-}$ |
| + | − | − | $\alpha_{+--}$ |
| − | − | − | $\alpha_{---}$ |

Assuming multiple runs at each combination of parameter values, each response value in the vector α represents the average response value of the EA when the control parameters are set to the corresponding levels associated with the particular response value. Furthermore, because the EA may depend upon other control parameters besides those analyzed, computer system 100 should determine the EA's average response value when those other parameters have a random value. To this end, computer system 100 may determine the average response value by executing the EA a number of times while randomly varying the values of the other parameters not analyzed by computer system 100.

Computer system 100 then determines an effects vector $\mu$ (step 230). Each coefficient of the effects vector $\mu$ represents a measure of either the direct effect of a control parameter or the interactive effect of two or more control parameters on the response value produced by the EA. These effect coefficients may include an average effect value, a number of primary effect values, and a number of interactive effect values. The average effect value describes the expected response value when each control parameter is set to a random or arbitrary value. Each primary effect value describes the effect of a given control parameter on the response of the EA, independent of all other parameters. An interactive effect value, on the other hand, describes how the effect of one parameter depends upon the value of at least one other parameter.

The number of coefficients included in the effect vector $\mu$ depends upon the number of control parameters analyzed by computer system 100. Specifically, the effect vector $\mu$ consists of: (1) an average effect value; (2) a primary effect value for each parameter analyzed; and (3) an interactive effect value for each combination of two or more parameters. Thus, for the case when computer system 100 analyzes three parameters, as in the example above, computer system 100 computes an average effect value $\mu_{avg}$, three primary effect values $\mu_1, \mu_2, \mu_3$, three second-order interactive effect values $\mu_{12}, \mu_{23}$, and $\mu_{13}$, and a single third-order interactive effect value $\mu_{123}$. In general, if k control parameters are selected for analysis, then the number of coefficients is $2^k$.

Computer system 100 determines the effect values using well known analysis of variance (ANOVA) techniques, such as those disclosed in D. C. Montgomery, "Design and Analysis of Experiments," Chapters 3, 7, and 9, ($3^{rd}$ ed. 1991), the relevant portions of which are hereby incorporated by reference. In particular, the effects vector $\mu$ is defined by the following vector equation:

$$\mu = n \cdot H_k \times \alpha, \qquad \text{Equation (1)}$$

where:

n represents a normalization constant for the Hadamard matrix;

k represents the number of control parameters analyzed by computer system 100;

$H_k$ represents the Hadamard matrix for a k-parameter EA analysis; and

α represents the corresponding response vector.

Because computer system 100 has previously determined the response vector α, as described above with respect to step 220, computer system 100 now determines the Hadamard matrix for the number of control parameters analyzed. To this end, the Hadamard matrix $H_k$ is constructed according to the following generalized equation:

$$H_k = \underbrace{H_1 \otimes H_1 \otimes \ldots H_1}_{k \text{ times}}$$

where:

$\otimes$ represents the tensor product; and $H_1$ represents the Hadamard unit matrix $$\begin{bmatrix} 1 & 1 \\ 1 & -1 \end{bmatrix}.$$

Thus, for the three control parameter case, the Hadamard matrix $H_3$ is constructed as follows:

$$H_3 = H_1 \otimes H_1 \otimes H_1$$

such that:

$$H_3 = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}$$

As stated above, the coefficient n represents a normalization constant for Hadamard matrix H. When properly normalized, the Hadamard matrix satisfies the expression $H_k \times H_k^t = I$, where I represents the identity matrix. For a Hadamard matrix $H_k$, the normalization constant n equals $1/(2^{k/2})$. Thus, for k=3, the normalization constant n=1/sqrt (8).

Returning to the three control parameter case described above, inserting $H_3$ into Equation (1) results in the following equation:

$$\begin{bmatrix} \mu_{avg} \\ \mu_1 \\ \mu_2 \\ \mu_{12} \\ \mu_3 \\ \mu_{13} \\ \mu_{23} \\ \mu_{123} \end{bmatrix} = \frac{1}{\sqrt{8}} \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix} \cdot \begin{bmatrix} \alpha_{+++} \\ \alpha_{-++} \\ \alpha_{+-+} \\ \alpha_{--+} \\ \alpha_{++-} \\ \alpha_{-+-} \\ \alpha_{+--} \\ \alpha_{---} \end{bmatrix}$$

Computer system 100 may then determine the value of each effect coefficient using the above vector equation. Solving for $\mu_{avg}$, for example, results in the following equation:

$$\mu_{avg} = n(\alpha_{+++} + \alpha_{-++} + \alpha_{+-+} + \alpha_{--+} \ldots + \alpha_{++-} + \alpha_{-+-} + \alpha_{+--} + \alpha_{---})$$

Note that the average effect value $\mu_{avg}$ represents the mean average of the response values of the different combination of parameter values. Thus, the average effect value $\mu_{avg}$ estimates the intrinsic average response of the EA, i.e., the expected response when all parameters are set to arbitrary values.

Similarly, the primary effect value $\mu_1$ is computed according to the following equation:

$$\mu_1 = n(\alpha_{+++} - \alpha_{-++} + \alpha_{+-+} - \alpha_{--+} \ldots + \alpha_{++-} - \alpha_{-+-} + \alpha_{+--} - \alpha_{---})$$

Computer system 100 may then display the effect vector $\mu$ to a programmer to provide an estimation of how each control parameter affects the response of the EA. In particular, the average effect value $\mu_{avg}$ estimates the intrinsic average response of the EA, as stated above. For the primary and interactive effect values, a programmer generally interprets this data according to the convention that a lower response value indicates that the EA will reach a higher quality solution. Thus, a positive value for a primary effect coefficient indicates that a positive change in the value of the corresponding parameter tends to increase the response value a of the EA (i.e., lowers the quality of the solution). The value of an interactive effect coefficient indicates the amount of interaction between the corresponding parameters. Thus, for a positive value, an increase in either of the corresponding parameters tends to increase the response value of the EA, thereby decreasing the quality of the solutions.

After computer system 100 determines the effects vector $\mu$, a programmer may then direct computer system 100 to perform either a prediction subroutine or a normalization subroutine (step 240). The prediction subroutine predicts a response value for a given change in the value of one or more of the parameters analyzed. The normalization subroutine determines normalization constants for each subfunction of an objective function. Normalizing the objective function provides stability and sensitivity equalization, thus allowing a programmer to more easily select values for the function's control parameters. The prediction and normalization subroutines are described in detail below with respect to FIG. 3 and FIG. 4, respectively.

Figure 3:
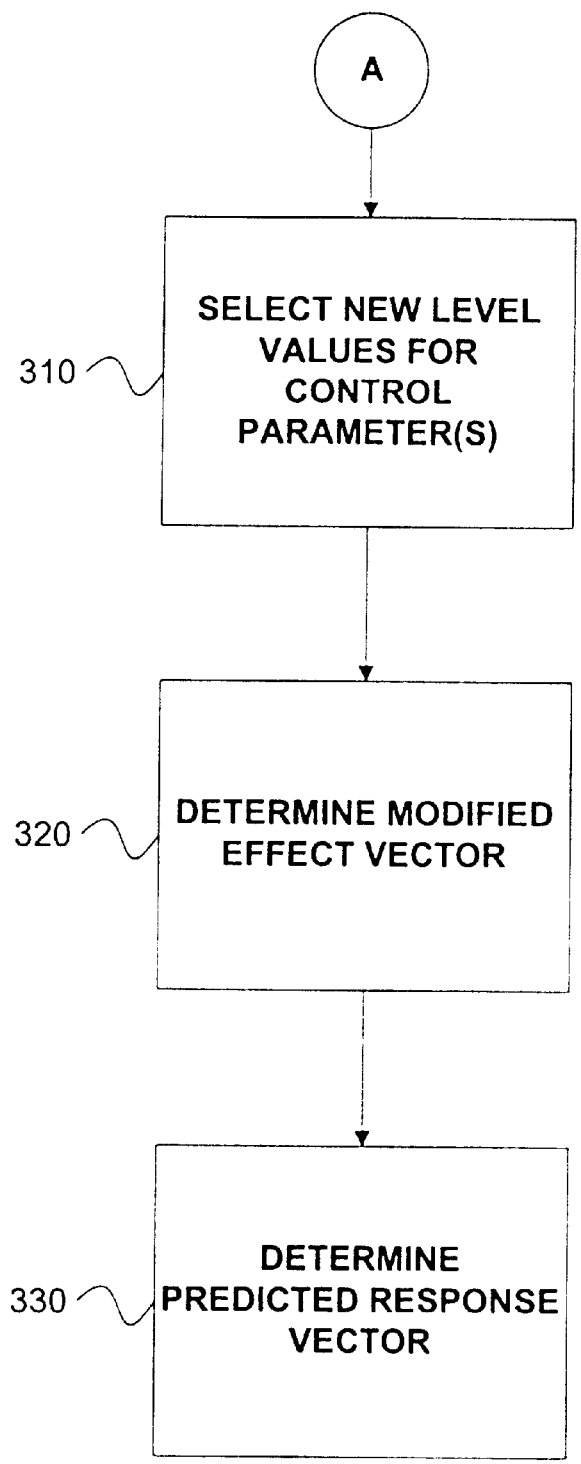
FIG. 3 is a flow diagram of a method consistent with the present invention for predicting the effects of changing a control parameter value.

FIG. 3 is a flow diagram of a method consistent with the present invention for predicting the effects of changing the value of a control parameter. As shown in FIG. 3, the method begins with the programmer selecting new high and low levels of control parameters for which computer system 100 will predict the new response value(s) (step 310).

Computer system 100 can determine the new response value(s) using Equation (1). Because the Hadamard matrix $H_k$ is orthogonal (when properly normalized), Equation (1) may be rearranged to solve for the predicted response values $\alpha'$, as follows:

$$\alpha' = nH_k^t \times \mu',$$

where $H_k^t$ represents the transpose of $H_k$, and where $\mu'$ represents a modified effects vector for when the control parameters are set to the new values.

Thus, to determine the new response values $\alpha'$, computer system 100 first determines the modified effect vector $\mu'$ based on the selected new parameter values (step 320). To compute each modified primary effect value, computer system 100 uses a conventional interpolation procedure. In particular, computer system 100 interpolates the modified primary effect value according to the change in the dynamic range of the control parameter. Consider the case for a primary effect coefficient $\mu_x$ corresponding to control parameter x, originally set to high and low levels $x_+$ and $x_-$, respectively. If the programmer changes the high and low levels to $x'_+$ and $x'_-$, respectively, then computer system 100 determines the modified primary effect coefficient $\mu'_x$ according to the following equation:

$$\mu'_x = \mu_x(x'_+ - x'_-)/(x_+ - x_-)$$

Further, systems 100 consistent with the present invention may perform other forms of interpolation, such as polynomial interpolation, when system 100 analyzes control parameters set to more than two levels (i.e., low, medium, and high levels).

To compute the modified average effect value $\mu'_{avg}$ computer system 100 calculates the following equations:

$$\mu'_{avg} = \mu_{avg} + \Delta\mu_{avg},$$

$$\Delta\mu_{avg} = [(\sqrt{2^k})/2][(x'_+ + x'_-) - (x_+ + x_-)][\mu_x/(x_+ - x_-)]$$

where:
- the quantity $(\sqrt{2^k})/2$ represents a normalization constant used for a normalized Hadamard matrix;
- the quantity $[(x'_+ + x'_-) - (x_+ + x_-)]$ represents the change in the midpoint of the dynamic range of parameter x; and
- the quantity $\mu_x/(x_+ - x_-)$ is the change in the effects coefficient for a unit change in the values of the control parameter x (note that system 100 may also use the quantity $\mu'_x/(x'_+ - x'_-)$).

Further, if the programmer changes the levels of more than one control parameter, computer system 100 determines the modified average effect value $\mu'_{avg}$ according to the equation $\mu'_{avg}=\mu_{avg}+\Delta\mu x_{avg}+\Delta\mu y_{avg}+\ldots$, where $\Delta\mu x_{avg}$ and $\Delta\mu y_{avg}$ represent the change in the average effect value for parameters x and y, respectively.

To compute a modified interactive effect value (e.g., one of $\mu_{12}$, $\mu_{23}$, $\mu_{13}$, or $\mu_{123}$), computer system 100 may use either an additive, multiplicative, or other reasonable model to represent the interactive effect. When using an additive model, a second-order interactive effect $\mu_{12}$ may be modeled using the following equation:

$$\mu_{12}=C_{12}(\mu_1+\mu_2)$$

Substituting the known values for $\mu_1$, $\mu_2$, and $\mu_{12}$ determined above during step 230, computer system 100 then solves for the constant $C_{12}$. The modified effect value for $\mu'_{12}$ can then be solved according to the following equation:

$$\mu'_{12}=C_{12}(\mu'_1+\mu'_2)$$

Computer system 100 can similarly determine modified higher-order interactive effect values by including additional primary effect coefficients in the model. Thus, computer system 100 may model a third-order interactive effect value $\mu_{123}$ by the equation $\mu_{123}=C_{123}(\mu_1+\mu_2+\mu_3)$. Alternatively, computer system 100 may determine the modified effect values using a two coefficient additive model $\mu_{12}=C_1\mu_2+C_1\mu_2$, or using a multiplicative model $\mu_{12}=C_{12}(\mu_1\times\mu_2)$.

Further, a programmer may instruct computer system 100 not to determine a modified interactive effect value if the programmer can physically control the actual interactive effect in the system or process modeled by the EA. In such a case, the programmer may manually set the interactive effect value to the value associated with the actual system or process. For example, if the actual interactive effect can be eliminated in the system or process, then the programmer may set the interactive effect value to zero.

In general, computer system 100 determines modified effect coefficients for each coefficient associated with a control parameter set to a new value in step 310. Thus, if only the first parameter is set to a new value, then computer system 100 would not determine a modified effect coefficient $\mu'_{23}$ for the modified effect vector $\mu'$. After determining the modified effect vector $\mu'$, computer system 100 then determines a predicted response vector $\alpha'$ based on the modified effect vector $\mu'$, using the above equation $\alpha'=nH'_k\times\mu'$ (step 330). In this way, computer system 100 can predict values of the response vector $\alpha'$ when the control parameters are set to different values. Accordingly, a programmer can easily predict the response of an EA to different parameter values without re-executing the EA.

As described above, an EA may use an objective function of the form $F(x)=w_0f_0(x)+w_1f_1(x)\ldots+w_{N-1}f_{N-1}(x)$ to determine the quality of each possible solution (x) to the problem at hand. Each subfunction $f_i(x)$ typically calculates a quality measure for a solution x in terms of a particular property of the problem at hand. In systems consistent with the present invention, a programmer may use computer system 100 to determine an effect vector $\mu$, as described above with respect to FIG. 2, that describes the effect of adjusting the bias weights $w_i$ of the objective function. Additionally, computer system 100 may determine a predicted response vector $\alpha'$, as described above with respect to FIG. 3, to determine the estimated response of the EA to a change in a bias weight $w_i$.

Computer system 100 also allows a programmer to determine normalization constants $n_i$ for each weighting factor $w_i$, such that a change in one weighting factor has approximately the same effect on the value of F(x) as a change in another weighting factor. This normalization procedure reduces instability of such objective functions (i.e., when a small change in an input value results in a large change in an output value). In particular, the dynamic range of one subfunction $f_j$ may be larger than that of another subfunction $f_k$. In such a case, equivalent changes in $w_j$ and $w_k$ will have vastly different effects on the value of F(x). Thus, one subfunction may dominate the overall value of the objective function, thereby decreasing the objective function's stability.

Figure 4:
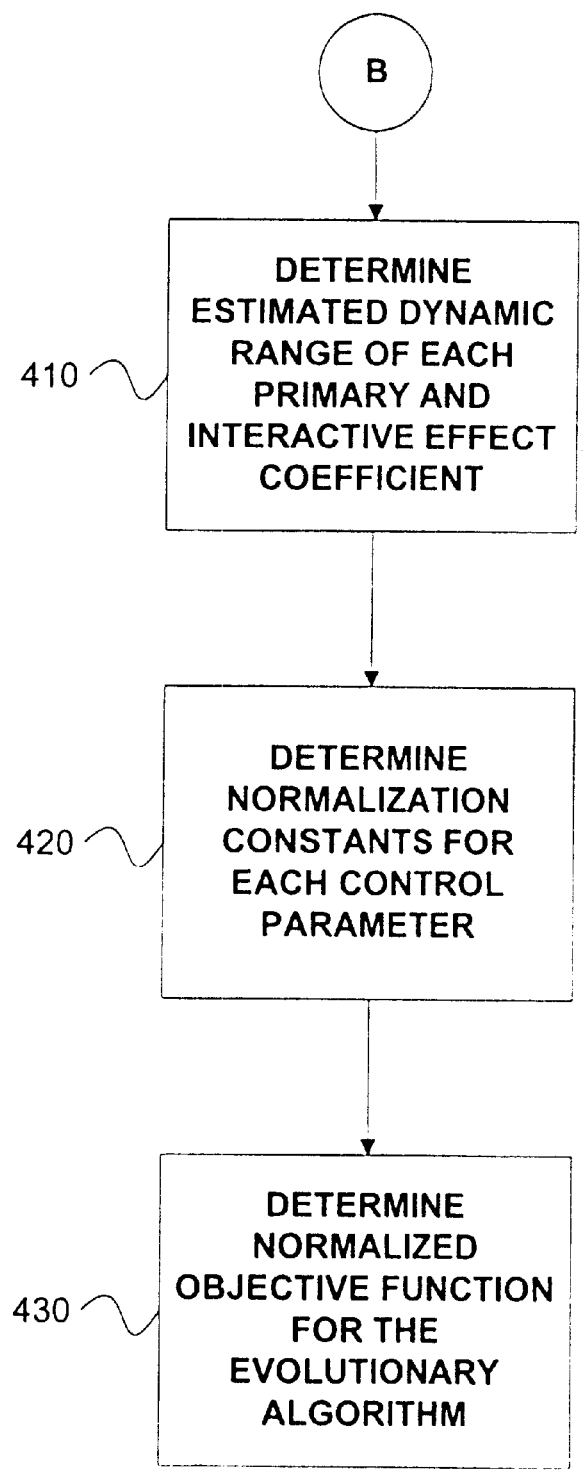
FIG. 4 is a flow diagram of a method consistent with the present invention for normalizing the subfunctions of an objective function.

FIG. 4 is a flow diagram of a method consistent with the present invention for normalizing the subfunctions $f_i(x)$ of an objective function. As shown in FIG. 4, the method begins with computer system 100 determining the estimated dynamic range of the primary and interactive effect coefficients of effects vector $\mu$ (step 410). The dynamic range of each coefficient estimates the possible range of that coefficient when its associated control parameters are varied over their possible range. To determine the dynamic range of a primary effect coefficient, computer system 100 preferably uses the following equation:

$$D_1 = \frac{|\mu_1|}{w_1^+ - w_1^-}$$

where:

$\mu_1$ represents the primary effect coefficient for the first control parameter;

$D_1$ represents the dynamic range of primary effect coefficient $\mu_1$;

$w_1^+$ represents the application's high level for weighting factor $w_1$; and $w_1^-$ represents the application's low level for weighting factor $w_1$.

To determine the dynamic range of a second-order interactive effect coefficient $D_{12}$, computer system 100 may use either the additive model or the multiplicative model discussed above with respect to step 320. In particular, computer system 100 may determine the dynamic range of an interactive effect coefficient $\mu_{12}$ using either the additive model ($D_{12}=C_{12}(D_1+D_2)$) or the multiplicative model ($D_{12}=C_{12}(D_1\times D_2)$), where the constant $C_{12}$ is the same as that determined above in step 320. Computer system 100 can determine the dynamic range of higher-order interactive effect coefficients by simply including the relevant additional terms in the model.

After determining the dynamic range of each effect coefficient of effect vector $\mu$, computer system 100 determines normalization constants for each control parameter (e.g., the bias weights) of the objective function (step 420). Although the objective function F(x) does not include a subfunction to account for the interaction between different factors, the normalization constants preferably account for any such interaction. To this end, computer system 100 may assume that the relative contribution of each primary effect to the corresponding interactive effect is proportional to the relative magnitudes of the primary effect coefficients. Accordingly, computer system 100 preferably determines the normalization constants according to the following generalized equations:

$$n_i = |\mu_i| \sum_{l=1}^{k} \sum_{j \in k_l^i} s_j, \quad \text{and} \quad s_j = \frac{D_j}{\sum_{m \in j} |\mu_m|}$$

where:

$n_i$ represents the normalization constant for the $i^{th}$ control parameter;

$D_j$ represents the dynamic range of the $j^{th}$ control parameter(s); and $k_l^i$ represents the set of all unique selections of l elements from the set $\{1, 2, \ldots, k\}$ that contains the element i.

For example, let k=4. Then $k_2^2=\{(1\ 2), (2\ 3), (2\ 4)\}$, and $k_3^1=\{(1\ 2\ 3), (1\ 2\ 4), (1\ 3\ 4)\}$. For j=(1 2 4), then $s_j=D_{124}/(|\mu_1|+|\mu_2|+|\mu_4|)$. Thus, the normalization constant nI using the above generalized equations with k=3 and i=1, we have:

$$n_1 = D_1 + \frac{D_{12}|\mu_1|}{|\mu_1|+|\mu_2|} + \frac{D_{13}|\mu_1|}{|\mu_1|+|\mu_3|} + \frac{D_{123}|\mu_1|}{|\mu_1|+|\mu_2|+|\mu_3|}$$

Computer system 100 then determines a normalized objective function (step 430). The following equation defines the resulting normalized objective function:

$$F(x) = (w_0/n_0)f_0(x) + (w_1/n_1)f_1(x) \ldots + (w_{N-1}/n_{N-1})f_{N-1}(x)$$

By computer system 100 normalizing the objective function according to the method of FIG. 4, a programmer can adjust the function's bias weights with greater stability. In particular, equivalent changes in the bias weights will produce nearly equivalent effects on the value of F(x).

Exemplary Scheduling EA Embodiment

For purposes of illustration, provided below is an example of using systems and methods consistent with the present invention to solve a scheduling problem. As stated above, U.S. Pat. No. 5,848,403 describes an EA that solves such a problem. The typical scheduling problem consists of scheduling a set of resources to perform certain field tasks in accordance with an overall objective. For example, a problem may entail scheduling field engineers, with varying skills and availabilities, to work on a number of equipment maintenance jobs dispersed throughout a geographic area. The overall objective usually consists of both customer service goals and operational goals (e.g., low travel costs, workload distribution, etc.). Therefore, the scheduling problem is determining the optimal assignment of resources to each field task.

To begin the analysis, a programmer defines the set of control parameters that computer system 100 will analyze. For example, computer system 100 may analyze the control parameters for population size p and number of evaluations n of the EA determining the optimal schedule. Computer system 100 then executes the EA to obtain a response vector α. The response vector α consists of response values for each of the possible combinations of parameter values. The table below shows exemplary response values for the different combinations of the two control parameters n and p, each set to one of two possible levels 0.2 and 0.6, designated as (−) and (+), respectively.

| n | p | α |
|---|---|---|
| + | + | 57 |
| − | + | 69 |
| + | − | 51 |
| − | − | 65 |

Computer system 100 then determines an effects vector $\mu$ based on the response values from the above table. Using equation (1), the following equation is obtained:

$$\begin{bmatrix} \mu_{avg} \\ \mu_p \\ \mu_n \\ \mu_{pn} \end{bmatrix} = n \begin{bmatrix} 1 & 1 & 1 & 1 \\ 1 & -1 & 1 & -1 \\ 1 & 1 & -1 & -1 \\ 1 & -1 & -1 & 1 \end{bmatrix} \cdot \begin{bmatrix} \alpha_{++} \\ \alpha_{-+} \\ \alpha_{+-} \\ \alpha_{--} \end{bmatrix}$$

Computer system 100 then calculates the value of each effect coefficient p using the above vector equation, providing the following:

$$\begin{pmatrix} \mu_{avg} \\ \mu_p \\ \mu_n \\ \mu_{pn} \end{pmatrix} = \begin{pmatrix} 121 \\ -13 \\ 5 \\ 1 \end{pmatrix}$$

As described above, these effect coefficient values provide an estimation of how each control parameter affects the response of the EA. In particular, the intrinsic average response $\mu_{avg}$ of the scheduling system is 121 at arbitrary values of n and p (note that the use of the normalization constant n causes the value of $\mu_{avg}$ to be double the intuitive value for the expected average response, i.e., 60.5). Furthermore, increasing the value of p tends to decrease the overall score, while increasing the value of n tends to have the opposite effect. Finally, a positive value for the interactive effect $\mu_{pn}$ indicates significant interaction between the two parameters, and that an increase in either parameter tends to increase the overall score.

Next, a programmer may then direct computer system 100 to perform a prediction subroutine. To do so, the programmer selects new high and low levels of a parameter value for which computer system 100 will predict new response values. For example, the programmer may wish to predict the response when the high and low levels of parameters n and p are changed to 0.1 and 0.9, respectively. Computer system 100 then determines the modified effect vector $\mu'$ based on the high and low levels.

To determine the modified primary effect values, computer system 100 uses a conventional interpolation procedure. The modified primary effect value is $\mu_p'=(-13)[(0.9-0.1)/(0.6-0.2)]=-26$. Similarly, $\mu_n'=(5)[(0.9-0.1)/(0.6-0.2)]=10$. The modified average effect value is $\mu_{avg}'=121+\{[(\sqrt{4}/2][(0.9+0.1)-(0.6+0.2)][-13/(0.6-0.2)]\}+\{[(\sqrt{4}/2][(0.9+0.1)-(0.6+0.2)][5/(0.6-0.2)]\}=121-6.5+2.5=117$. Assuming the programmer has not adjusted the actual system or process to change the interaction between n and p, then computer system 100 will not determine a modified interactive effect value $\mu_{pn}'$.

After determining the modified effect vector $\mu'=(117, -26, 10, 1)$, computer system 100 then determines the predicted response vector $\alpha'$ based on the modified effect vector $\mu'$ using the equation $\alpha'=H_k^t \times \mu'$. Substituting the known values, provides:

$$\begin{bmatrix} \alpha++ \\ \alpha-+ \\ \alpha+- \\ \alpha-- \end{bmatrix} = \frac{1}{2}\begin{bmatrix} 1 & 1 & 1 & 1 \\ 1 & -1 & 1 & -1 \\ 1 & 1 & -1 & -1 \\ 1 & -1 & -1 & 1 \end{bmatrix} \cdot \begin{bmatrix} 117 \\ -26 \\ 10 \\ 1 \end{bmatrix} = \begin{bmatrix} 51 \\ 76 \\ 40 \\ 67 \end{bmatrix}$$

Therefore, computer system 100 provides the programmer with the predicted responses of the EA to the new parameter values for n and p, without re-executing the EA.

The EA solving the scheduling problem may use an objective function that determines the quality of each possible solution based on the travel time between tasks and based on labor costs. In such a case, the objective function may be of the form $F(x)=w_t t(x)+w_l l(x)$, where t and l represent travel time and labor costs, respectively. The programmer may then use computer system 100 to analyze the control parameters t and l.

Similar to that described above for parameters n and p, computer system 100 may execute the EA to obtain a response vector α for different values of $w_t$ and $w_l$. The table below shows exemplary response values for the different combinations of the two control parameters $w_t$ and $w_l$, each set to one of the two possible levels 0.1 and 0.9, designated as (−) and (+), respectively.

| $w_t$ | $w_l$ | α |
|---|---|---|
| + | + | 65 |
| − | + | 85 |
| + | − | 75 |
| − | − | 175 |

Computer system 100 then determines an effects vector μ based on the response values from the above table. Using equation (1), the following equation is obtained:

$$\begin{bmatrix} \mu_{avg} \\ \mu_l \\ \mu_t \\ \mu_{lt} \end{bmatrix} = n \begin{bmatrix} 1 & 1 & 1 & 1 \\ 1 & -1 & 1 & -1 \\ 1 & 1 & -1 & -1 \\ 1 & -1 & -1 & 1 \end{bmatrix} \cdot \begin{bmatrix} \alpha++ \\ \alpha-+ \\ \alpha+- \\ \alpha-- \end{bmatrix}$$

Computer system 100 then calculates the value of each effect coefficient μ using the above vector equation, providing the following:

$$\begin{pmatrix} \mu_{avg} \\ \mu_l \\ \mu_t \\ \mu_{lt} \end{pmatrix} = \begin{pmatrix} 200 \\ -60 \\ -50 \\ 40 \end{pmatrix}$$

As described above, these effect coefficient values provide an estimation of how each control parameter affects the response of the EA. In particular, the intrinsic average response $\mu_{avg}$ of the scheduling system is 200 at arbitrary values of $w_t$ and $w_l$. Furthermore, increasing the values of either $w_t$ and $w_l$ tends to decrease the overall score. But that decrease tends to be offset by the interactive effect $\mu_{lt}$, which indicates that an increase in either parameter tends to increase the overall score.

Next, a programmer may then direct computer system 100 to perform a prediction subroutine. To do so, the programmer selects new high and low levels of parameter values for which computer system 100 will predict new response values. For example, the programmer may wish to predict the response when both parameters $w_t$ and $w_l$ are set to high and low levels of 0.7 and 0.3, respectively. Thus, the dynamic range has decreased by one half. Computer system 100 then determines the modified effect vector μ' based on the selected new levels.

To determine the modified primary effect values, computer system 100 uses a conventional interpolation procedure. The modified primary effect value is $\mu_1'=(-60)[(0.7-0.3)/(0.9-0.1)]=-30$. Similarly, $\mu_t'=(-50)[(0.7-0.3)/(0.9-0.1)]=-25$. The modified average effect value is $\mu'_{avg}=200+\{[(\sqrt{4})/2][(0.7+0.3)-(0.9+0.1)][-60/(0.9-0.1)]\}+\{[(\sqrt{4})/2][(0.7+0.3)-(0.9+0.1)][-50/(0.9-0.1)]\}=200+0+0=200$. Assuming the programmer has not adjusted the actual system or process to change the interaction between l and t, then computer system 100 will not determine a modified interactive effect value $\mu_{lt}'$.

After determining the modified effect vector μ'=(200, −30, −25, 40), computer system 100 then determines the predicted response vector α' based on the modified effect vector μ' using the equation $\alpha'=H^t_k \times \mu'$. Substituting the known values, provides:

$$\begin{bmatrix} \alpha++ \\ \alpha-+ \\ \alpha+- \\ \alpha-- \end{bmatrix} = \frac{1}{2}\begin{bmatrix} 1 & 1 & 1 & 1 \\ 1 & -1 & 1 & -1 \\ 1 & 1 & -1 & -1 \\ 1 & -1 & -1 & 1 \end{bmatrix} \cdot \begin{bmatrix} 200 \\ -30 \\ -25 \\ 40 \end{bmatrix} = \begin{bmatrix} 92.5 \\ 82.5 \\ 77.5 \\ 147.5 \end{bmatrix}$$

Therefore, computer system 100 provides the programmer with the predicted responses of the EA to the new parameter values for $w_t$ and $w_l$, without re-executing the EA.

Finally, the programmer may direct computer system 100 to determine normalization constants $n_t$ and $n_l$ for weighting factors $w_t$ and $w_l$, respectively, such that a change in one weighting factor has approximately the same effect on the value of F(x) as a change in another weighting factor. Computer system 100 first determines the estimated dynamic range of the primary and interactive effect coefficients of the effect vector μ determined above. The dynamic range of the primary effect coefficients are solved as follows:

$$D_l = \frac{|\mu_l|}{w_l^+ - w_l^-} = \frac{-60}{0.8} = -75$$

$$D_t = \frac{|\mu_t|}{w_t^+ - w_t^-} = \frac{-50}{0.8} = -62.5$$

To determine the dynamic range of the interactive effect $\mu_{lt}$, computer system 100 may use the multiplicative model $D_{lt}=C_{lt}(D_l \times D_t)$. Accordingly, computer system 100 first determines the constant $C_{lt}$. Substituting the know values into the equation $\mu_{lt}=C_{lt}(\mu_l \times \mu_t)$, provides $C_{lt}=\mu_{lt}/(\mu_l \times \mu_t)$, $C_{lt}=0.0133$. Accordingly, $D_{lt}=(0.0133)(-75)(-62.5)=62.5$.

Computer system 100 then determines the normalization constants for the weighting factors $w_t$ and $w_l$. Taking into account the interaction between the two weighting factors, computer system 100 determines the normalization constants according to the following equations:

$$n_l = D_l + \left(\frac{|D_l|}{|D_l|+|D_t|}\right)D_{lt} = -75 + \frac{75}{137.5}(62.5) = -40.9$$

$$n_t = D_t + \left(\frac{|D_t|}{|D_t|+|D_l|}\right)D_{lt} = -62.5 + \frac{62.5}{137.5}(62.5) = -34.1$$

Computer system 100 then determines the normalized objective function. Substituting the values determined above, the normalized objective function is provided as follows:

$F(x)=(w_t/-34.1)t(x)+(w_l/-40.9)l(x)$

Therefore, computer system 100 allows the programmer to normalize the objective function, thereby providing greater stability when adjusting the bias weights.

Conclusion

Systems and methods consistent with the present invention evaluate control parameters of an evolutionary algorithm to thereby allow a programmer to efficiently select values for the control parameters. Such methods consistent with the present invention are applicable to all programs for execution in a multiprocessor system regardless of the computer programming language. For example, both C++ and Java are programming languages commonly used to develop programs for execution by multiprocessor computer systems.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, the described implementation includes software but the present invention may be implemented as a combination of hardware and software or in hardware alone. Additionally, different ANOVA techniques may be used depending upon the particular application. Further, the invention may be implemented with both object-oriented and non-object-oriented programming systems. Finally, the invention may analyze objective functions having any form that returns a numerical result.

Although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet; or other forms of RAM or ROM. The scope of the invention is defined by the claims and their equivalents.

What is claimed is:

1. A computer implemented method for analyzing an evolutionary algorithm using a response vector α and an effect vector μ, the method comprising the steps, performed by a processor, of:

determining a plurality of control parameters that control the operation of the evolutionary algorithm;

executing the evolutionary algorithm according to a set of the determined control parameters, with each control parameter having a value selected from a range of values for each control parameter, to obtain a corresponding response vector α with response values; and determining the effect vector μ, having coefficients $\mu_i$, from the response vector α, with each coefficient $\mu_i$ representing a respective effect on the response value due to at least one change in the value of at least one of the plurality of control parameters.

2. The method of claim 1, wherein at least one of the control parameters may be set to one of a plurality of values, and wherein the executing step further includes the substep of:

executing the evolutionary algorithm when the at least one control parameter is set to each of the plurality of values, thereby obtaining a plurality of corresponding response values.

3. The method of claim 1, wherein the executing step further includes the substep of:

executing the evolutionary algorithm to obtain an average response of the evolutionary algorithm when the plurality of control parameters are set to a respective determined value.

4. The method of claim 1, wherein the step of determining the effect vector further includes the substep of:

determining an average effect value describing an average response value of the evolutionary algorithm when the control parameters are set to respective random values.

5. The method of claim 1, wherein the step of determining the effect vector further includes the substep of:

determining a primary effect value describing the effect of a particular control parameter on the response value of the evolutionary algorithm, independent of any other control parameter.

6. The method of claim 1, wherein the step of determining the effect vector further includes the substep of:

determining an interactive effect value describing how the effect of one control parameter on the response value of the evolutionary algorithm depends upon the value of another control parameter.

7. The method of claim 1, wherein the step of determining the effect vector further includes the step of determining the effect vector using analysis of variance techniques.

8. The method of claim 1, further including the step of:

displaying the effect vector to a user to provide an indication of the effect of the control parameters on the response value of the evolutionary algorithm.

9. The method of claim 1, further including the step of:

predicting a new response value of the evolutionary algorithm due to setting at least one control parameter to a new value.

10. The method of claim 9, wherein the predicting step further includes the substep of:

determining a modified effect vector describing an effect on the response value due to the new value of the at least one control parameter.

11. The method of claim 1, wherein the executing step further includes the substep of:

determining an objective function that provides a quality measure of the response value of the evolutionary algorithm.

12. The method of claim 11, wherein the objective function includes a plurality of subjective functions biased by a respective weight control parameter, the method further including the step of:

normalizing the objective function such that a change in a first weight control parameter has substantially the same effect on the objective function as a corresponding change to a second weight control parameter.

13. The method of claim 12, wherein the normalizing step further includes the substep of:

determining a dynamic range of the effect vector.

14. A computer for analyzing an evolutionary algorithm using a response vector α and an effect vector μ, the computer comprising:

a memory having program instructions; and a processor, responsive to the programming instructions, configured to:

determine a plurality of control parameters that control the operation of the evolutionary algorithm;

execute the evolutionary algorithm according to a set of the determined control parameters, with each control parameter having a value selected from a range of values for each control parameter, to obtain a corresponding response vector α with response values; and determine the effect vector $\mu$, having coefficients $\mu_i$, from the response vector $\alpha$, with each coefficient $\mu_i$ representing a respective effect on the response value due to at least one change in the value of at least one of the plurality of control parameters.

15. The computer of claim 14, wherein at least one of the control parameters may be set to one of a plurality of values, and wherein the processor is further configured to:

execute the evolutionary algorithm when the at least one control parameter is set to each of the plurality of values, thereby obtaining a plurality of corresponding response values.

16. The computer of claim 14, wherein the processor is further configured to:

execute the evolutionary algorithm to obtain an average response of the evolutionary algorithm when the plurality of control parameters are set to a respective determined value.

17. The computer of claim 14, wherein the processor is further configured to:

determine an average effect value describing an average response value of the evolutionary algorithm when the control parameters are set to respective random values.

18. The computer of claim 14, wherein the processor is further configured to:

determine a primary effect value describing the effect of a particular control parameter on the response value of the evolutionary algorithm, independent of any other control parameter.

19. The computer of claim 14, wherein the processor is further configured to:

determine an interactive effect value describing how the effect of one control parameter on the response value of the evolutionary algorithm depends upon the value of another control parameter.

20. The computer of claim 14, wherein the processor is further configured to determine the effect vector using analysis of variance techniques.

21. The computer of claim 14, wherein the processor is further configured to:

display the effect vector to a user to provide an indication of the effect of the control parameters on the response value of the evolutionary algorithm.

22. The computer of claim 14, wherein the processor is further configured to:

predict a new response value of the evolutionary algorithm due to setting at least one control parameter to a new value.

23. The computer of claim 22, wherein the processor is further configured to:

determine a modified effect vector describing an effect on the response value due to the new value of the at least one control parameter.

24. The computer of claim 14, wherein the processor is further configured to:

determine an objective function that provides a quality measure of the response value of the evolutionary algorithm.

25. The computer of claim 24, wherein the objective function includes a plurality of subjective functions biased by a respective weight control parameter, and wherein the processor is further configured to:

normalize the objective function such that a change in a first weight control parameter has substantially the same effect on the objective function as a corresponding change to a second weight control parameter.

26. The computer of claim 25, wherein the processor is further configured to:

determine a dynamic range of the effect vector.

27. An apparatus for evaluating an evolutionary algorithm using a response vector $\alpha$ and an effect vector $\mu$, the apparatus comprising:

means for determining a plurality of control parameters that control the operation of the evolutionary algorithm;

means for executing the evolutionary algorithm according to a set of the determined control parameters, with each control parameter having a value selected from a range of values for each control parameter, to obtain a corresponding response vector $\alpha$ with response values; and means for determining the effect vector $\mu$, having coefficients $\mu_i$, from the response vector $\alpha$, with each coefficient $\mu_i$ representing a respective effect on the response value due to at least one change in the value of at least one of the plurality of control parameters.

28. The apparatus of claim 27, wherein at least one of the control parameters may be set to one of a plurality of values, and wherein the means for executing further includes:

means for executing the evolutionary algorithm when the at least one control parameter is set to each of the plurality of values, thereby obtaining a plurality of corresponding response values.

29. The apparatus of claim 27, wherein the means for executing further includes:

means for executing the evolutionary algorithm to obtain an average response of the evolutionary algorithm when the plurality of control parameters are set to a respective determined value.

30. The apparatus of claim 27, wherein the means for determining the effect vector further includes:

means for determining an average effect value describing an average response value of the evolutionary algorithm when the control parameters are set to respective random values.

31. The apparatus of claim 27, wherein the means for determining the effect vector further includes:

means for determining a primary effect value describing the effect of a particular control parameter on the response value of the evolutionary algorithm, independent of any other control parameter.

32. The apparatus of claim 27, wherein the means for determining the effect vector further includes:

means for determining an interactive effect value describing how the effect of one control parameter on the response value of the evolutionary algorithm depends upon the value of another control parameter.

33. The apparatus of claim 27, wherein the means for determining the effect vector further includes:

means for determining the effect vector using analysis of variance techniques.

34. The apparatus of claim 27, further including:

means for displaying the effect vector to a user to provide an indication of the effect of the control parameters on the response value of the evolutionary algorithm.

35. The apparatus of claim 27, further including:

means for predicting a new response value of the evolutionary algorithm due to setting at least one control parameter to a new value.

36. The apparatus of claim 35, wherein the means for predicting further includes:

means for determining a modified effect vector describing an effect on the response value due to the new value of the at least one control parameter.

37. The apparatus of claim 27, wherein the means for executing further includes:

means for determining an objective function that provides a quality measure of the response value of the evolutionary algorithm.

38. The apparatus of claim 37, wherein the objective function includes a plurality of subjective functions biased by a respective weight control parameter, the apparatus further including:

means for normalizing the objective function such that a change in a first weight control parameter has substantially the same effect on the objective function as a corresponding change to a second weight control parameter.

39. The apparatus of claim 38, wherein the normalizing means further includes:

means for determining a dynamic range of the effect vector.

40. A computer-readable medium containing instructions for controlling a data processing system to perform a method for analyzing an evolutionary algorithm using a response vector $\alpha$ and an effect vector $\mu$, the method comprising the steps of:

determining a plurality of control parameters that control the operation of the evolutionary algorithm;

executing the evolutionary algorithm according to a set of the determined control parameters, with each control parameter having a value selected from a range of values for each control parameter, to obtain a corresponding response vector $\alpha$ with response values; and determining the effect vector $\mu$, having coefficients $\mu_i$, from the response vector $\alpha$, with each coefficient $\mu_i$ representing a respective effect on the response value due to at least one change in the value of at least one of the plurality of control parameters.

* * * * *